March 16, 1943.    J. P. BENOIT    2,314,303
GLASS BLOWING MACHINE
Filed Dec. 12, 1940    4 Sheets-Sheet 1

J.P.Benoit
INVENTOR
BY Rule & Hoge
ATTORNEYS

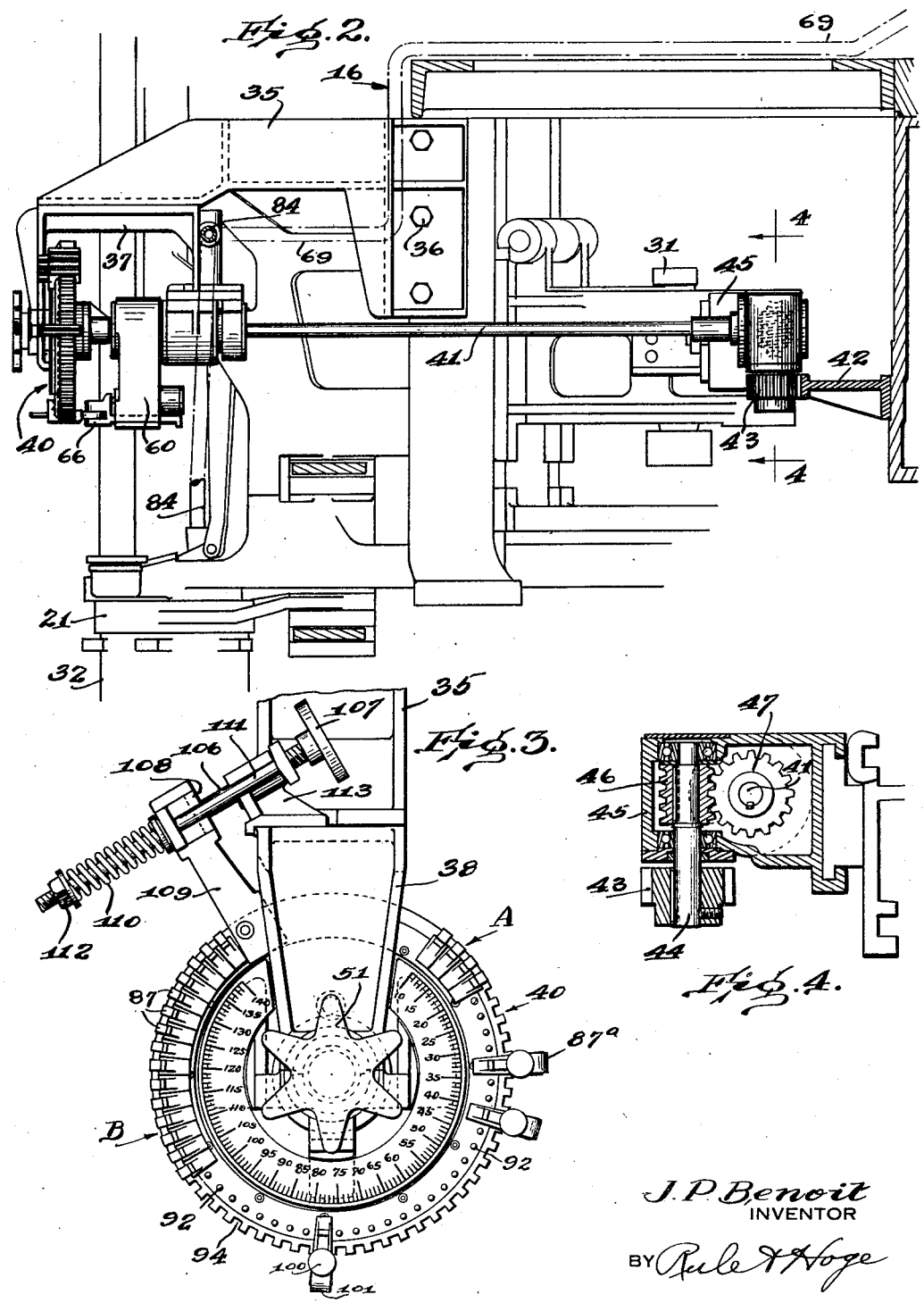

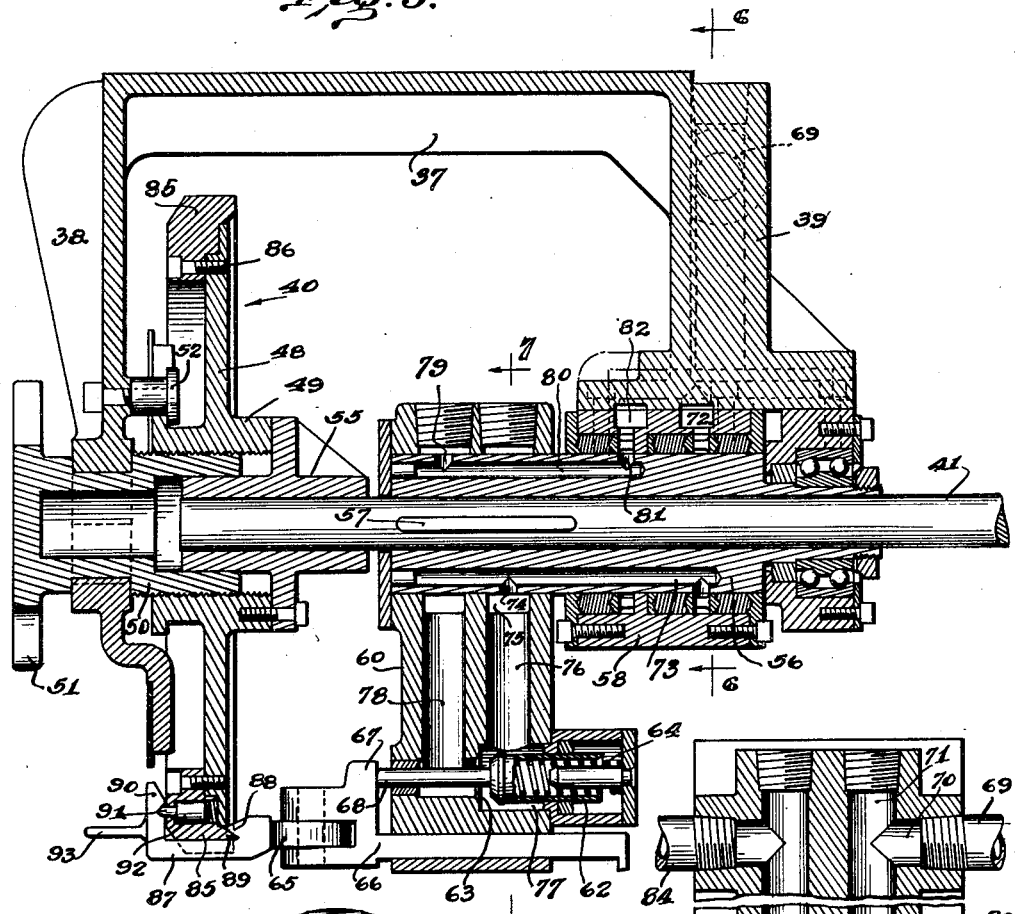

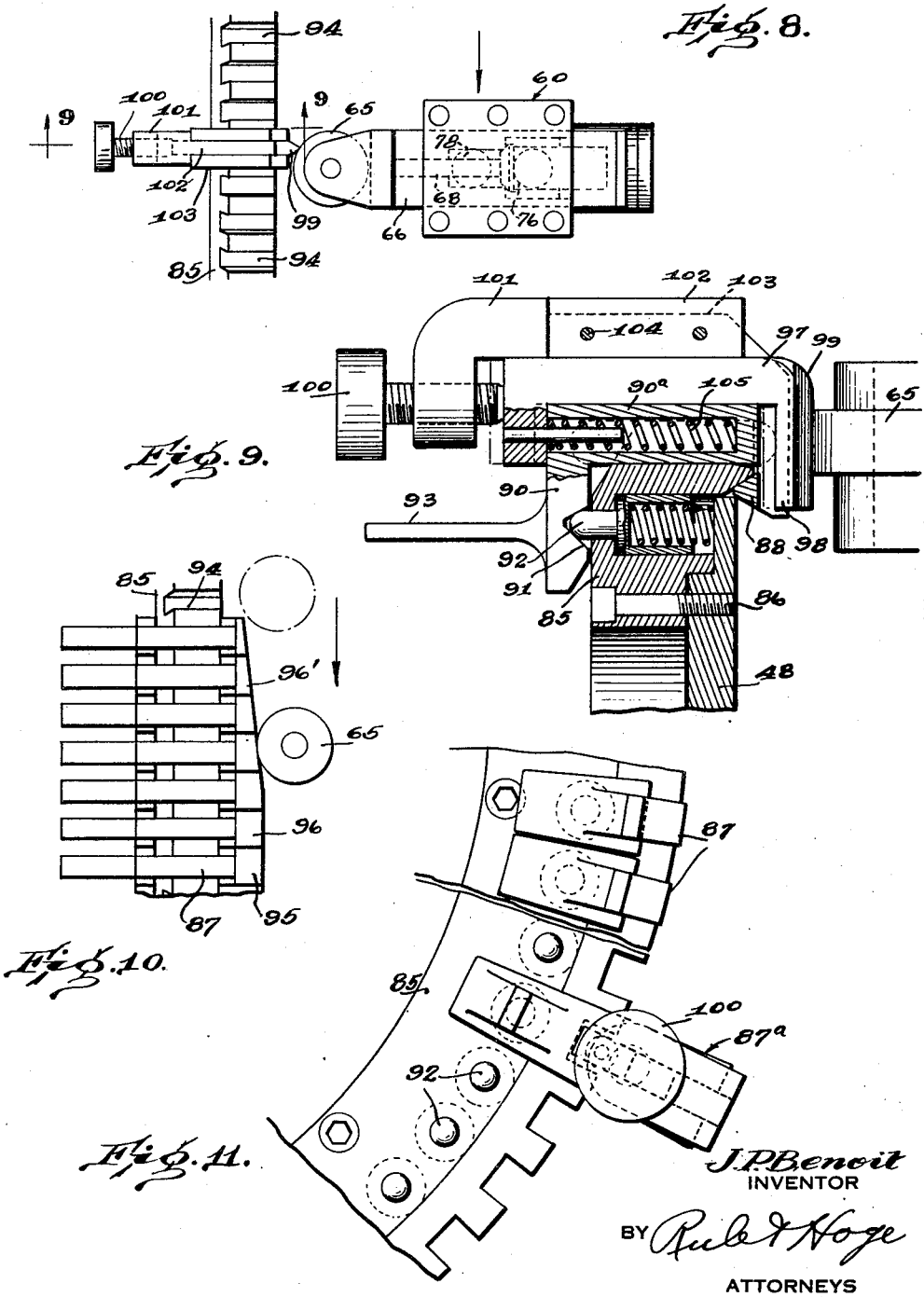

Patented Mar. 16, 1943

2,314,303

UNITED STATES PATENT OFFICE 2,314,303

GLASS BLOWING MACHINE

Joseph P. Benoit, Alton, Ill., assignor to Owens-Illinois Glass Company, a corporation of Ohio Application December 12, 1940, Serial No. 369,834

6 Claims. (Cl. 49—19)

My invention relates to machines for blowing hollow glass articles including bottles, jars and other ware and relates particularly to mechanism for controlling and regulating the application of air under pressure for blowing the glass within the molds. The invention as herein illustrated is particularly adapted for use with glass blowing machines of the suction gathering type, such as the Owens suction gathering machines. The invention, however, may be adapted to other types of machines.

The Owens type suction machine includes a series of mold groups, each comprising a body blank mold and a neck mold which together form the parison gathering mold, and a finishing mold in which the parison is blown to finished form. The parison molds are lowered periodically and in succession to bring their lower open ends into contact with a pool of molten glass and the charges of glass are drawn by suction into the mold cavities. When a mold has received its charge, it is lifted from the pool and a knife is swung across the lower end of the mold to sever the glass and form a temporary bottom closure for the mold cavity. Air under pressure is then applied through the upper end of the parison mold to compact the glass therein. The air pressure supply is then cut off and the knife is withdrawn. After the blank has cooled for a required interval so that it can retain its shape without the support of the body blank mold, the latter is opened, leaving the parison suspended from the neck mold, and after a time interval the finishing mold is closed around the parison. Air under pressure is then supplied to blow the parison to its finished form within the finishing mold. After the knife has been withdrawn and before the parison is enclosed in the finishing mold, one or more puffs of air are supplied at required intervals for developing the parison. It is common practice to control the above blowing operations by a stationary cam designed to operate the air valves at the required intervals, a single cam being employed to control the opening and closing of the air valves for all of the series of mold groups on the machine. It is also old in the art, as shown in the patent to Morin, 1,875,818, to employ cams individual to the finishing molds to control the length of time the blowing air is applied in each finishing mold.

An object of the present invention is to provide novel means individual to the mold units for operating the air valves which control the air supply for blowing the parisons, and for controlling the time and duration of each of the several applications of air pressure employed in the development of a parison.

A further object of the invention is to provide means individual to the mold groups for individually controlling the air supply to the different molds, permitting the time and duration of the different blowing operations to be individually regulated and controlled, thereby providing great flexibility in the control of such blowing operations and, moreover, permitting such blowing operations to be adapted to each individual mold in accordance with the requirements of the particular mold which is being used. In this manner the blowing operations can be adjusted to meet the requirements for producing satisfactory ware when a variety of molds are being used at one time on a machine and where the blowing requirements are materially different for the different molds, depending upon the size and shape of the blown article, thickness of the walls of the article and other variable factors.

Other objects of the invention will appear hereinafter.

Referring to the accompanying drawings which illustrate a preferred form of my invention as applied to an Owens type of suction gathering machine:

Fig. 2 is a part-sectional elevation of the parts shown in Fig. 1.

Fig. 3 is an end elevation of the cam mechanism controlling the air supply to the molds.

Fig. 4 is a section at the line 4—4 on Fig. 2.

Fig. 5 is a sectional elevation showing a cam disk or carrier and a cam operated valve mechanism.

Fig. 6 is a section at the line 6—6 on Fig. 5.

Fig. 7 is a section at the line 7—7 on Fig. 5.

Fig. 8 is a fragmentary view showing a portion of a cam carrier, a puff cam, and a valve actuated thereby.

Fig. 9 is a section at the line 9—9 on Fig. 8.

Fig. 10 is a fragmentary view of a cam group.

Fig. 11 is a fragmentary view of a cam carrier and cams thereon.

Figure 1:
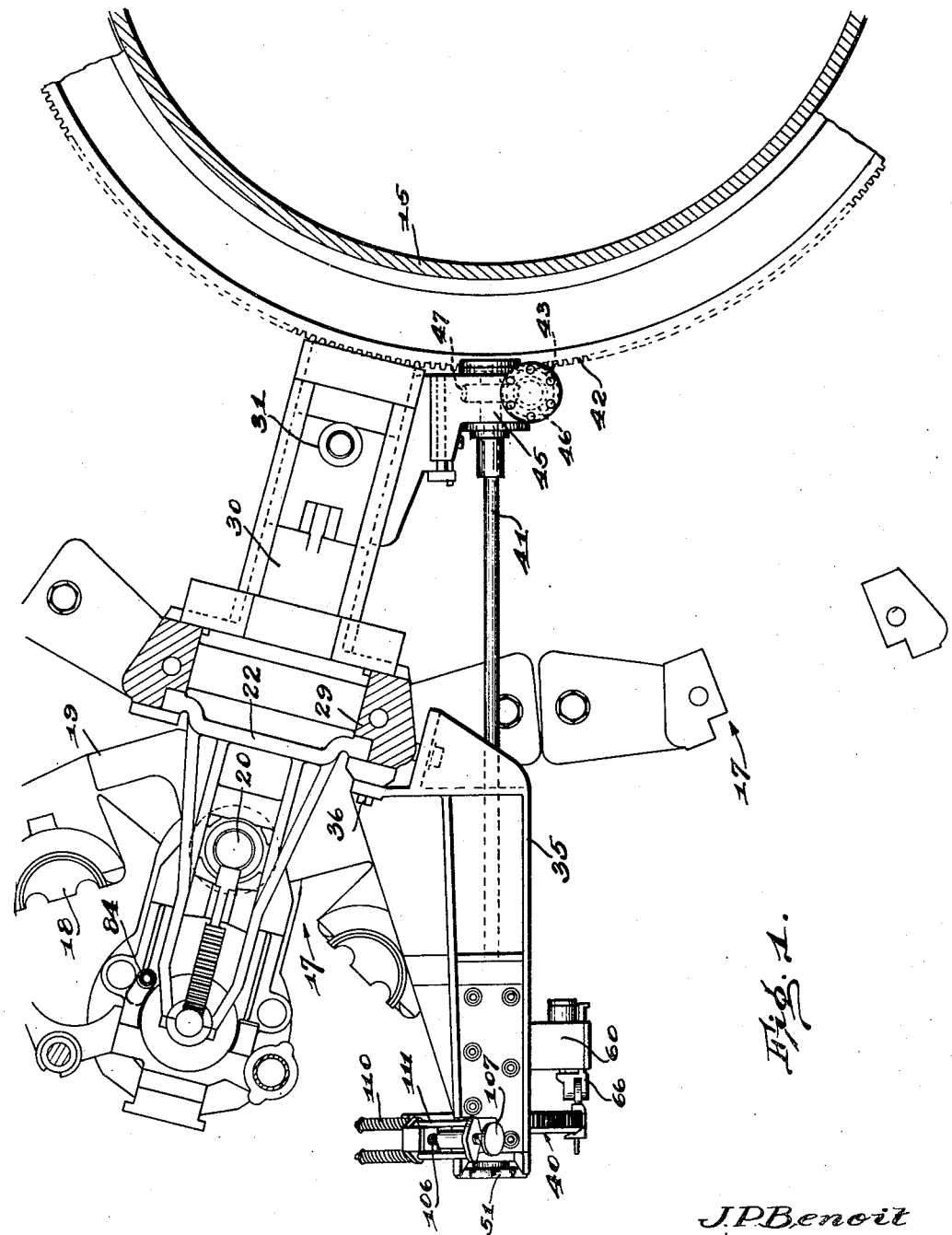
Fig. 1 is a fragmentary, part-sectional plan view of the machine, showing particularly one head or unit.

Referring particularly to Figs. 1 and 2, the machine as shown comprises a central stationary column 15 on which is mounted a mold carriage 16 rotatable continuously about the vertical axis of the column 15. An annular series of heads or units 17 is mounted to rotate with the mold carriage. Each said unit comprises a body blank mold including partible sections 18 carried on arms 19 which swing about a pivot pin 20 for opening and closing the mold. Associated with each body blank mold is a neck mold 21 positioned above and adapted to register with the blank mold when the latter is closed. The parison mold (comprising the body blank mold and neck mold) is carried on a dip-head 22 movable in vertical guideways formed in frame members 29 for lowering the mold to a charge-gathering position, with the lower open end of the mold in contact with a pool of molten glass. Mechanism 30 for opening and closing the blank mold includes a cam roll 31 running on a stationary cam mounted on the column 15. A finishing mold 32 (Fig. 2) mounted to rotate with the carriage is adapted to be lifted and closed around the parison suspended from the neck mold 21 after the blank is opened.

The parts described in the preceding paragraph are conventional in an Owens type machine. The present invention relates particularly to novel mechanism for controlling the air supply to the molds as will now be described.

Each unit 17 (Figs. 1 and 2) comprises a bracket arm 35 extending radially of the mold carriage and attached by means of bolts 36 to one of the uprights 29. Attached to the under surface of each arm 35 is a U-shaped frame 37 comprising depending arms 38 and 39 (Fig. 5) to provide a support for a cam carrier 40 and for the outer end of a drive shaft 41 extending radially of the machine. The shafts 41 are rotated continuously by means of a stationary ring gear 42 mounted on the column 15 and operating through gear trains individual to the said shafts. Each said gear train includes a pinion 43 (Figs. 2 and 4) keyed to a vertical shaft 44 journaled in a gear box 45 mounted on the carriage, said pinion running in mesh with the ring gear 42. A worm 46 keyed on the shaft 44 drives a worm gear 47 keyed to the shaft 41, said worm and gear being housed in the gear box 45. The gearing is so proportioned that the drive shaft 41 is given one complete rotation about its axis during a complete revolution of the mold carriage about its axis.

The cam carrier 40 (see Figs. 3 and 5) comprises a circular plate or disk 48 formed with a hub 49 having internal screw threads to receive the threaded end of a tubular adjusting member 50 rotatively mounted in the arm 38. Said adjusting member is formed with a knob or handle 51. Rotation of the adjusting member serves to adjust the cam carrier in the direction of its axis, thereby adjusting the cams for the purpose hereinafter described. The cam carrier is held against rotation about its own axis, except for adjustment, by means hereinafter described. A stop lug 52 overhangs a flange on the hub 49 and limits the inward adjusting movement of the cam carrier. The outer end of the shaft 41 is journalled in a bushing 55 attached to the hub 49.

A cylindrical air distributing head 56 is mounted on the drive shaft 41 and connected for rotation therewith by a key 57. Said head rotates within a tubular member or strap 58 (Figs. 5 and 6) attached by bolts 59 to the lower end of the arm 39. Mounted on and extending radially from the head 56 is an arm 60 (Figs. 5 and 7) connected for rotation therewith by a bolt 61. A valve 62 mounted in the arm 60 controls the supply of air to the mold for blowing the glass therein as hereinafter described. The valve controls a port 63 and is moved to closed position by a coil spring 64. The valve is opened by means of cams on the cam carrier 40 which engage a cam roll 65 journalled in a slide bar 66 mounted in the arm 60, said slide bar formed with a lug 67 to engage a pin 68 projecting from the valve.

Air under pressure is conducted from a distributing head (not shown) through an air line including a pipe 69 (Figs. 2 and 6) leading from the distributing head to a port 70 in the arm 39. Said port opens into a vertical conduit 71 leading to an annular passageway 72 which surrounds the head 60 and opens in to a channel 73 extending lengthwise through the head 56. The channel 73 has a port 74 opening into an annular channel 75 which communicates with a passageway 76 extending through the arm 60 and opening into the valve chamber 77. The air line continues through the valve port 63 into a second passageway 78 extending through the arm 60 and communicating through a port 79 with a channel 80 opening through a port 81 into an annular passageway 82 in the arm 39. The passageway 82 communicates with a channel 83 (Fig. 6) opening into a pipe 84 (Figs. 6, 1 and 2) extending to the mold. When the valve 63 is opened by means of a cam as presently described, air under pressure is supplied through the air line just described to the mold.

The cam carrier 40 includes a cam supporting ring 85 attached by bolts 86 to the cam disk 48 and forming the rim of the carrier. Removably mounted on the ring 85 are cam patches or cam sections 87 arranged in groups to provide extended cam surfaces and so-called "puff" cams 87ª, each standing and operating alone to give a quick opening and closing movement to the valve, and thereby supply a puff of air to the mold. Each of the cams 87 and 87ª includes a hook 88 (Figs. 5 and 9) to engage a beveled edge 89 formed on the inner side of the ring 85. The cam section includes a horizontal bar or body 90ª (Fig. 9) which seats on the peripheral surface of the ring 85, and an arm 90 to engage the outer side surface of the ring 85, said arm being formed with a notch 91 to receive a spring actuated detent 92 mounted in the ring 85. A handle 93 on the cam section provides a convenient means for attaching the cam to or removing it from said ring. Thus by lowering the handle 93 (Fig. 5) the cam section is disengaged from the detent and released from the cam holder.

Referring to Figs. 5, 3 and 11, it will be seen that a multiplicity of cam holding detents 92 are provided, said detents being arranged in a circle and spaced at intervals corresponding to the width of the cam sections. The ring 85 is formed in its outer peripheral surface with notches 94 to receive the cam sections and hold them against lateral movement. Each cam section 87 is formed with a head 95 having a face 96 forming a cam surface on which the roll 65 runs.

Referring to Fig. 10, it will be seen that the cam faces 96 provide a cam surface extending uninterruptedly along the group of cams and which may be extended to any desired length, depending on the number of cam sections grouped together. If desired, some of the heads 95 may be of graduated thickness and formed with inclined faces to provide an inclined cam surface section 96' for causing a gradual outward movement of the cam roll as it runs onto the cam group.

Referring to Figs. 8, 9 and 11, it will be seen that each puff cam assembly includes an attachment comprising a bar 97 and a bar 101 thereover. The bar 97 seats on the cam section 87 therebeneath and is provided at its forward end with a depending arm 98 formed with a V-shaped nose 99 to engage the cam roll, thus providing an auxiliary cam overlying the cam section 87 on which it is mounted. The bar 97 is adjustable lengthwise by means of an adjusting screw 100 which is threaded through the depending end of the bar 101 and bears against the end of the bar 97. The bar 101 as shown comprises an extension 102 of reduced width which fits between side walls 103 projecting upwardly from the body 90a, said side walls also forming a guideway for the bar 97. Screws 104 or other attaching means serve to removably hold the bar 101 in assembled relation to the body 90a. A coil spring 105 holds the bar 97 against the adjusting screw.

In operation the drive shaft 41 is rotated continuously as the mold carriage rotates about its axis so that the cam roll 65 rotating with said shaft is actuated by the cams on the carrier 40. With the cam sections arranged and grouped as shown in Fig. 3, the cam roll will first engage a cam group A and thereby operate the valve 62 to open the port 63 and supply air under pressure to the parison mold. This blowing operation is timed to take place immediately after the knife is operated to sever the parison in the mold from the supply body of glass and serves to compact the glass within the mold.

After this blowing operation has been completed, the knife is withdrawn. At predetermined time intervals thereafter the puff cams 87a operate. Each such operation serves to open the valve momentarily and allow a puff of air under pressure to be applied in the mold. The extent to which the valve is opened by each puff cam can be regulated and adjusted by means of the adjusting screws 100 individual to said cams. After the puff cams have operated and the parison has been developed, the latter is enclosed within the finishing mold. The valve is then opened by the cam group B for the final blowing operation which expands the parison to finished form, the air pressure being maintained until the glass has cooled and hardened so that it can retain its shape independently of the mold.

Adjustment of the cam carrier 40 by means of the hand wheel 51 serves to adjustably vary the extent to which the valve is opened by all of the cams. The carrier 40 is also adjustable through a limited angle about its own axis for adjustably regulating the precise time at which the valve is opened. The means for effecting such adjustment (see Figs. 1 and 3) comprises a screw shaft 106 threaded through a bracket 113 mounted on the bracket 38. The shaft 106 is provided with an adjusting knob 107. The end of the screw shaft bears against a head 108 on the outer end of an arm 109 attached to and extending radially from the cam carrier 40. Coil springs 110 are mounted on a pair of parallel rods 111 extending through openings in the head 108 and slidable lengthwise therein. The springs are held under compression between said head and adjustable stop nuts 112 on the outer ends of said rods and serve to hold the arm 109 against the end of the screw 106. This adjusting mechanism permits a fine rotative adjustment of the cam carrier, the range of adjustment being through an angle corresponding to the width of a cam patch.

Modifications may be resorted to within the spirit and scope of my invention.

I claim:

1. A machine for forming hollow glass articles comprising a mold, an air line extending to the mold, a valve in said air line, a cam carrier, a cam roll, means for driving said roll and causing it to travel in a path adjacent the cam carrier, operating connections between the cam roll and the valve, said cam carrier comprising a cam holding ring, a plurality of cam sections removably mounted on said ring, means on said ring for holding certain of the cam sections in groups with each said group forming together an uninterrupted cam surface in the path of said cam roll, separate cam devices, and means for removably mounting said separate cam devices on selected ones of said cam sections, said separate cam devices each comprising a nose positioned in the path of the cam roll and shaped and positioned to normally engage and immediately release the cam roll during the travel of the latter and thereby effect a momentary operation of the valve.

2. A machine for forming hollow glass articles comprising a mold, an air line extending to the mold, a valve in said air line, a cam carrier, a cam roll, means for driving said roll and causing it to travel in a path adjacent the cam carrier, operating connections between the cam roll and the valve, said cam carrier comprising a disk, cam patches removably mounted on the periphery of the disk, means for adjustably moving the disk in a direction lengthwise of its axis, and separate means for adjusting the disk rotatively about its axis.

3. A machine for forming hollow glass articles comprising a mold, an air line extending to the mold, a valve in said air line, a cam carrier, a cam roll, means for driving said roll and causing it to travel in a circular path adjacent the cam carrier, operating connections between the cam and the valve, said carrier comprising a stationary disk and cam patches removably mounted on the periphery of the disk and projecting forwardly from one face of the disk into the path of the cam roll and operative through the cam roll to open the valve, and means for adjustably moving the disk in a direction lengthwise of its axis and thereby adjustably varying the extent to which the valve is opened by said cam patches.

4. A machine for forming hollow glass articles comprising a mold, an air line extending to the mold, a valve in said air line, a cam carrier, a cam roll, means for driving said roll and causing it to travel in a circular path adjacent the cam carrier, operating connections between the cam and the valve, said carrier comprising a stationary disk and cam patches removably mounted on the periphery of the disk and projecting forwardly from one face of the disk into the path of the cam roll and operative through the cam roll to open the valve, and means for effecting a fine adjustment of the disk rotatively about its axis and thereby adjustably varying the time at which the valve is opened.

5. A machine for forming hollow glass articles comprising a rotatable mold carriage, a mold thereon, an air line extending to the mold, a valve in said air line, means for actuating the valve comprising a drive shaft journalled on the mold carriage, a stationary ring gear, driving gearing between said ring gear and drive shaft for rotating the latter in synchronism with the rotation of the mold carriage, said driving gearing being proportioned and arranged to impart one complete rotation to the drive shaft during each complete rotation of the carriage about its axis, a cam roll connected to rotate with the drive shaft, a circular stationary cam carrier concentric with said shaft, cams removably mounted on said carrier and projecting from one face thereof into the path of the cam roll, means for adjusting said carrier in a direction lengthwise of said shaft, and operating connections between the cam roll and the valve for causing each cam to open the valve a distance corresponding to the position of adjustment of the cam carrier.

6. A machine for forming hollow glass articles comprising a rotatable mold carriage, a mold thereon, an air line extending to the mold, a valve in said air line, means for actuating the valve comprising a drive shaft journalled on the mold carriage, a stationary ring gear, driving gearing between said ring gear and drive shaft for rotating the latter in synchronism with the rotation of the mold carriage, said driving gearing being proportioned and arranged to impart one complete rotation to the drive shaft during each complete rotation of the carriage about its axis, a cam roll connected to rotate with the drive shaft, operating connections between the cam roll and the valve, a cam carrier, cams removably mounted on the carrier and arranged to project into the path of the cam roll a predetermined distance, and auxiliary cams removably mounted on certain of said first mentioned cams and projecting into the path of the cam roll a greater distance than said first mentioned cams for effecting a comparatively wide opening of the valve, said auxiliary cams extending a comparatively short distance in the direction of travel of the roll for causing the valve to be opened for correspondingly short durations.

JOSEPH P. BENOIT.